United States Patent
Uchiyama et al.

(10) Patent No.: US 6,800,697 B2
(45) Date of Patent: Oct. 5, 2004

(54) PROCESS FOR PRODUCING RETARDATION FILM

(75) Inventors: Akihiko Uchiyama, Tokyo (JP); Masakazu Tsujikura, Tokyo (JP); Takashi Kushida, Tokyo (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/018,139

(22) PCT Filed: Apr. 24, 2001

(86) PCT No.: PCT/JP01/03503
§ 371 (c)(1),
(2), (4) Date: Dec. 18, 2001

(87) PCT Pub. No.: WO01/81959
PCT Pub. Date: Nov. 1, 2001

(65) Prior Publication Data
US 2003/0086027 A1 May 8, 2003

(30) Foreign Application Priority Data
Apr. 24, 2000 (JP) ........................................ 2000-122489

(51) Int. Cl.$^7$ .............................................. C08L 69/00
(52) U.S. Cl. ...................... 525/469; 525/462; 525/469; 525/437; 528/196
(58) Field of Search .......................... 525/50, 462, 469, 525/437; 528/196

(56) References Cited

U.S. PATENT DOCUMENTS 4,150,170 A * 4/1979 Lazear et al.
4,525,532 A * 6/1985 Tung et al.

FOREIGN PATENT DOCUMENTS

| EP | 1 045 261 A1 | 10/2000 |
|---|---|---|
| JP | 03-029921 A | 2/1991 |
| JP | 04-194902 A | 7/1992 |
| JP | 6-82624 A | 3/1994 |
| JP | 06-174922 A | 6/1994 |
| JP | 06-230368 A | 8/1994 |
| JP | 7-52270 A | 2/1995 |
| JP | 7-299828 A | 11/1995 |
| JP | 8-160222 A | 6/1996 |

OTHER PUBLICATIONS

International Search Report.

* cited by examiner

Primary Examiner—Kuo-Liang Peng
(74) Attorney, Agent, or Firm—Sughrue Mion, PLLC

(57) ABSTRACT

In the present invention, a retardation film is produced by adjusting the mixing ratio of at least two kinds of mutually compatible polymers A and B and by forming the resulting mixture into the film. The polymers A and B are copolymers comprising respective two common repeating units and different in copolymerization composition. According to the present invention, the retardation film having the desired wavelength dispersion can industrially and simply be produced. Furthermore, there can be provided the high-quality retardation film capable of controlling the wavelength dispersion of the retardation at a high level.

17 Claims, No Drawings

PROCESS FOR PRODUCING RETARDATION FILM

TECHNICAL FIELD

This invention relates to a method for producing a retardation film and more particularly it relates to a method for producing a retardation film in which the retardation has desired wavelength dispersion characteristics (wavelength dependence) with good productivity. The retardation film is suitably used for, for example, optical devices such as a liquid crystal display device, an optical pickup used in recorders or an optical recording medium, a light-emitting device, an optical arithmetic device, an optical communication device or a touch panel.

BACKGROUND ART

Retardation films are generally used in display devices such as a liquid display device and have functions such as color compensation, widening of the viewing angle and antireflection. Thermoplastic polymers such as polycarbonates obtained by polycondensing bisphenol A, polyether sulfones, polysulfones, polyvinyl alcohol or norbornene resins are generally used as a material for the retardation films.

The retardation films are usually used in, for example, a liquid crystal display device of a super twisted nematic (STN) mode for the purpose of color compensation or widening the viewing angle. As to a method for producing the retardation films, the followings are known as producing methods by mixing two polymers.

JP-A No. 4-194902 (1992) (hereinafter JP-A means Japanese Unexamined Patent Publication) describes a method for producing retardation films by mixing a polymer exhibiting a positive birefringence with a polymer exhibiting a negative birefringence. Specifically, there are respective descriptions of the retardation films each having a little viewing angle dependence and obtained by uniaxially stretching a film formed by mixing poly(2,6-dimethyl-1,4-phenylene oxide) with polystyrene or by mixing polyvinyl chloride with polymethyl methacrylate.

Japanese Patent Publication No. 2780190 describes a retardation film prepared by uniaxially stretching a film of a mixture of at least two kinds of polymers or a film of a copolymer, wherein a method for combining polymers different in positivity and negativity of photoelastic constant is disclosed. There is a specific description of polystyrene mixed with polypropylene in a ratio of 1:2.6.

JP-A No. 6-174922 (1994) describes a retardation film formed from a composition obtained by mixing two polycarbonate resins having photoelastic constants satisfying a specific relationship. Specifically, there is a description of a bisphenol A type polycarbonate resin mixed with a polycarbonate resin prepared from a raw material consisting essentially of a bispenol A derivative having two methyl groups of the central carbon in bisphenol A substituted with phenyl groups and containing a small amount of bisphenol A.

In a reflective type liquid crystal display device, especially a reflective type liquid crystal display device using only one polarizing plate, there is a case where the device is optically prepared so that the retardation film is combined with the polarizing plate to develop functions so as to produce circularly polarized light.

In such a liquid crystal display device, an optical design of the retardation film is usually prepared in order to optimize optical characteristics as the whole display device. The wavelength dispersion characteristic of the retardation which is one of optical characteristics, however, is roughly determined by the material constituting the retardation film. Furthermore, practically usable materials are limited. In general, since polymers are mutually poor in compatibility, phase separation is caused when the polymers are mixed. When the resulting mixture is optically observed, the haze is resultantly high and the mixture is unsuitable for the retardation film. The combination of mutually compatible polymers is extremely rare such as that described in the above J-PA No. 4-194902 (1992).

Therefore, in the present situation, it is difficult to prepare the optical design so that the wavelength dispersion of the retardation of a retardation film matches with the wavelength dispersion of the retardation of a liquid crystal cell because the kinds of practically usable polymeric materials are limited. There are problems that manufacturers of the retardation films should hold a great many materials to consider the formation of the materials into films in order to provide various retardation films having the wavelength dispersion characteristics of the retardation required by many liquid crystal display device producers. Further, in the combination of the compatible polymers as described above of polymers of different kinds, the kinds are limited and there are problems about heat durability or productivity.

JP-A No. 6-230368 (1994) describes a retardation film having a birefringence of zero at a certain wavelength of visible light, wherein there is a description of the retardation film obtained by a method for laminating two retardation films different in wavelength dependence of the retardation or different in positivity and negativity of the photoelastic constant in a certain direction, or by a method for stretching a mixture of plural polymers or copolymers.

However, no description is specifically given of what kind of polymers or copolymers can be used as to a method for stretching the mixture of the plural polymers or copolymers at all.

The following techniques of laminating two films are known as methods for producing a retardation film having the controlled wavelength dispersion of the retardation.

JP-A No. 5-27119 (1993) describes the production of a retardation film by laminating two birefringent films having a specific retardation.

Japanese Patent Publication No. 2609139 describes the production of a retardation film by laminating two or more specific birefringent films different in wavelength dependence of the retardation at a specific angle.

In these cases, steps of laminating plural retardation films or adjusting the angle of lamination are required and there are problems in productivity because the plural retardation films are used. Since the thickness of the whole retardation films is increased, there are problems that the light transmittance is lowered and a display device becomes thick or dark when the retardation films are assembled therein.

A main object of the present invention is to provide a method for producing a retardation film capable of controlling the wavelength dispersion characteristics of the retardation, readily and at a high level.

Another object of the present invention is to provide a method for producing a retardation film quickly responsive to requirements for the various wavelength dispersion characteristics from customers.

A further object of the present invention is to provide a method for producing one retardation film formed of the same kind of polymer, readily and with good productivity.

DISCLOSURE OF THE INVENTION

The present inventors have searched for a method for producing a retardation film, readily and under good control, wherein the retardation has desired wavelength dispersion characteristics, by placing emphasis on a method for mixing two polymers, in order to solve the above problems. Especially, the inventors have made intensive studies on polymeric materials for the retardation film. The present inventors considered that the compatibility among polymers used is extremely important while taking optical characteristics such as high transparency or high optical uniformity required by the retardation film, mechanical characteristics, handleability and film formability at ultrahigh levels into consideration. As a result, the inventors have found a method for efficiently producing the above objective retardation film by combining at least two kinds of copolymers having the same repeating units and different in copolymerization composition and by controlling the mixing ratio thereof. Thereby, the present invention has been accomplished.

Namely, the present invention is a method for producing a retardation film, which comprises the steps of mixing mutually compatible polymers A and B which satisfy the following conditions (1) and (2), and of forming the resulting mixture into a film, wherein the mixing ratio is adjusted so that the film has desired wavelength dispersion characteristics of retardation:

(1) the polymer A is a copolymer comprising repeating units a and b, and
(2) the polymer B is a copolymer comprising the repeating units a and b and is different from the polymer A in copolymerization composition.

DETAILED DESCRIPTION OF THE INVENTION

In the present invention, at least two kinds of mutually compatible polymers A and B are mixed. The polymers A and B are copolymers having at least the two common repeating units, wherein the wavelength dispersion characteristics of the retardation of both are not all the same in the retardation film formed from the polymer A and the retardation film formed from the polymer B. In the present invention, such two polymers different in the characteristics are mixed to control the characteristics thereof. In other words, two or more kinds of compatible polymers having not all the same wavelength dispersion of the retardation when each of the polymers is solely formed into the retardation film are mixed. Although detailed in Examples, a retardation film having an optional retardation wavelength dispersion of 0.25 to 1.06 can be obtained according to the mixing ratio, for example, two polycarbonate copolymers, wherein optical anisotropies of both the polymers A and B are positive, R(450)/R(550) of the former is 1.06 and R(450)/R(550) of the latter is 0.25 while adjusting the mixing ratio both the polymer A and B.

The method mentioned above is conventionally unknown to methods for producing the retardation film, and a method with extremely bad productivity wherein a great many polymeric materials having different retardation wavelength dispersions are held is inevitably adopted, as described before, when attempts to obtain the retardation film having the objective retardation wavelength dispersion are made. According to the present invention, the retardation film having an optional retardation wavelength dispersion, however, can be obtained by holding, for example, only two kinds of polymers, and mixing the polymers with controlling the amounts thereof. Although the above specific example is an example of mixing the two kinds of polymers, two or more kinds of polymers may be used.

Since the retardation film needs to be transparent, it is important that the mixed polymers A and B can mutually be compatibilized (are compatible). To be compatible herein means that a haze value of the retardation film formed from the obtained mixture is 2% or below. The haze value is preferably 1% or below, more preferably 0.5% or below.

The phase difference (retardation) of the retardation film is the difference in phase when light passes through the retardation film of thickness d, based on the difference in speeds of advance of light (refractive index) in the orientation direction of the film and the perpendicular direction thereto and expressed as the product $\Delta n \cdot d$ of the difference $\Delta n$ in refractive index between the orientation direction and the perpendicular direction thereto and the film thickness d. The orientation direction is described later.

Since the retardation ($\Delta n \cdot d$) is proportional to the birefringence $\Delta n$ when the retardation film is the same, the wavelength dispersion (wavelength dependence) of the retardation can be represented by wavelength dispersion (wavelength dependence) of the birefringence $\Delta n$.

In the present invention, when the refractive index in the orientation direction in the plane of the retardation film is larger than the refractive index in the direction perpendicular to the orientation direction, the optical anisotropy is defined as positive, and when it is smaller, the optical anisotropy is defined as negative. The orientation direction of the retardation film is determined by stretching an unstretched film. When the glass transition point temperature of the polymer forming the film is Tg, the orientation direction is the stretching direction if the film is uniaxially stretched under temperature conditions in the vicinity of Tg (within the range of Tg–5° C. to Tg+20° C.).

Furthermore, in the present invention, the retardation is an absolute value of the retardation. When the optical anisotopy is negative, the retardation is negative. In the present invention, positive and negative signs are neglected unless otherwise specified.

The wavelength at which the positivity or negativity of the optical anisotropy is judged is 550 nm.

According to the present invention, a retardation film, which has desired retardation wavelength dispersion characteristics, can be provided by controlling the mixing amounts of at least two kinds of polymers A and B and therefore by readily controlling the retardation wavelength dispersion of the film.

The polymers A and B may be different in optical anisotropy (that is the combination of positivity and negativity) and may be the same, namely, both may be positive or both may be negative.

In the present invention, the expression "the polymer is positive or negative" or "the retardation wavelength dispersion of the polymer" is an abbreviated expression and, in fact, has each the same meaning as "the optical anisotropy of the retardation film comprising the polymer is positive or negative" or "the retardation wavelength dispersion of the retardation film comprising the polymer".

Both the optical anisotropies of the polymers A and B are preferably positive or negative when each of the polymers A and B is solely formed into the retardation film, that is the optical anisotropy of the retardation film formed from the polymer A is preferably positive and the optical anisotropy of the retardation film formed from the polymer B is preferably positive or the optical anisotropy of the retardation film formed from the polymer A is preferably negative and the optical anisotropy of the retardation film formed from the polymer B is preferably negative. In the case of the polymer A, the optical anisotropy is evaluated by using a retardation film obtained by preparing an unstretched film from the polymer A according to a solution casting method and then uniaxially stretching the resulting unstretched film to about 1.1 to 3 times under temperature conditions in the vicinity of Tg (within the range of Tg−5° C. to Tg+20° C.).

In the present invention, all the wavelength dispersions of the retardation are not the same when each of the polymers A and B is solely formed into the retardation film, respectively. Namely, the wavelength dispersion characteristics of the retardation in the retardation film formed from the polymer A alone (retardation film A) are different from the wavelength dispersion characteristics of the retardation in the retardation film formed from the polymer B alone (retardation film B). Either one of the retardation film A and the retardation film B preferably has wavelength dispersion characteristics of the retardation satisfying the following formula (1):

$$R(450)/R(550)<1 \qquad (1)$$

wherein R(450) and R(550) are each the retardation in the film plane of the retardation film measured at measuring wavelengths of 450 nm and 550 nm.

The retardation wavelength dispersion can readily be controlled within a wider range by using the polymers having the characteristics. Conditions for forming each of the polymers A and B solely into the retardation film are the same as the conditions in the case for evaluating the above optical anisotropy.

In addition, it is more preferable to select the polymer A or B such that the retardation film comprising the polymer A alone satisfies the above formula (1), and the retardation film comprising the polymer B alone satisfies the following formula (2):

$$R(450)/R(550) \geq 1 \qquad (2)$$

The wavelength dispersion of the retardation, specifically within the range wherein a ratio of R(450)/R(550) is a value less than 1 to a value of 1 or above, can readily be obtained simply by suitably changing the mixing ratio of the polymers A and B with the use of the polymer A and B having the above characteristics.

The degree of differences between the wavelength dispersion of the retardation in the retardation film solely formed from the polymer A and the one in the retardation film solely formed from the polymer B is preferably 0.1 or above in the difference between a ratio of R(450)/R(550) of the polymer A and the ratio of the polymer B.

The difference between a ratio of R(450)/R(550) of the polymer A and the ratio of the polymer B is preferably 0.15 or above, more preferably 0.2 or above especially when the optical anisotropies of the polymers A and B are the same. This is because the larger difference means the more extended range for controlling the wavelength dispersion of the retardation film. However, this rule does not apply to the case that the optical anisotropies of the polymers A and B are positive and negative because the signs are different. When the optical anisotropies are positive and negative, a retardation film having a wide range of wavelength dispersion can be produced by adjusting the mixing ratio of the both polymers, even if a wide difference in the retardation wavelength dispersion between the both is not ensured.

The polymers A and B used in the present invention will be explained hereinafter.

The polymers A and B are copolymers comprising repeating units a and b, with the proviso that the polymers A and B are different in content of the repeating units a and b. Namely, the copolymerization composition of the polymers A and B is not the same. The copolymerization composition is not especially limited if the polymers A and B are compatible. The sequence in the polymers is not especially limited if the polymers A and B are compatible. The polymers A and B may be random or block copolymers. At least either one of the polymers A and B may have a repeating unit c, as a copolymerization component, other than the repeating units a and b.

One or more kinds of the third polymers, if compatible with the polymers A and B, may further be used in combination when the polymers A and B are used. In this case, the third polymers are preferably thermoplastic polymers from the viewpoint of formability of the retardation film.

Specific polymers used in the present invention are not especially limited insofar as the polymers are mutually compatible and satisfy the above conditions. However, the polymers are preferably selected from thermoplastic polymers which are excellent in heat resistance and good in optical performances, have film-forming properties and can be formed into films by a melt extrusion method or a solution casting method. Examples of the thermoplastic polymers include aromatic polyester polymers, polyolefins, polyethers, polysulfones and polyethersulfones. Among them, the aromatic polyester polymers such as polyarylates, polyesters or polycarbonates are good in heat resistance, film-forming properties and optical characteristics. Above all, the polycarbonates are preferable because of their greater advance in transparency, heat resistance, film-forming properties and productivity.

The combination of the polymers A and B in the thermoplastic polymers of the same kind is favorable due to particular excellence in compatibility.

As the polymers A and B in the present invention, copolymers comprising a structure having a fluorene skeleton (for example, comprising 1 to 99 mole % based on the whole) have heat resistance, film-forming properties and a low photoelastic constant and are well balanced as for a retardation film. Therefore, at least either one of the repeating units a and b of the polymers A and B preferably has the structure having the fluorene skeleton. At least either one of the repeating units a and b is more preferably a component derived from a bisphenol having a fluorene ring. It is extremely advantageous that both the repeating units a and b are more preferably such components from the viewpoint of the compatibility.

The bisphenol component having the fluorene ring is represented by the following formula:

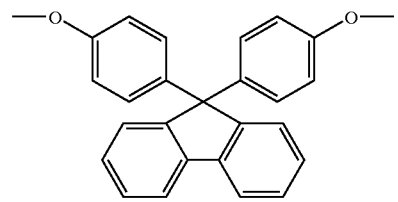

wherein hydrogen atoms in the benzene rings in the above formula may be substituted with hydrocarbon groups of 1 to 6 carbon atoms such as an alkyl group or an aryl group, or halogen atoms.

As mentioned above, the ratios of the repeating units a and b in the polymers A and B are not especially limited if the polymers are compatibilized. The characteristics such as optical characteristics of the retardation film depend mainly on the structures and contents of the repeating units a and b contained in the mixture of the polymers A and B. Therefore, the ratios of the respective repeating units a and b of the two polymers A and B and the mixing amounts of the polymers A and B may suitably be determined so as to provide a retardation film having desired characteristics. The ratio of the repeating units a and b in the polymer A can respectively be determined, for example the repeating unit a is preferably within the range of 1 to 99 mole %, more preferably within the range of 10 to 90 mole %, especially preferably within the range of 50 to 90 mole %, and the repeating unit b is preferably within the range of 99 to 1 mole %, more preferably within the range of 90 to 10 mole %, especially preferably within the range of 90 to 50 mole %.

When one example is specifically cited, a polycarbonate copolymer X respectively using 30 mole % of a bisphenol monomer [A] and 70 mole % of a bisphenol monomer [B] each having the fluorene ring and a polycarbonate copolymer Y in which 70 mole % of the bisphenol monomer [A] is similarly copolymerized with 30 mole % of the bisphenol monomer [B] are mentioned, in Examples described later. The copolymers X and Y are compatible even in any mixing ratio. Retardation films having various wavelength dispersions of the retardation can be prepared simply by optionally changing the mixing ratio of the copolymers X and Y.

Specific examples of the polycarbonate copolymers preferably used as the polymers A and B include polycarbonate copolymers in which a repeating unit represented by the following formula (I):

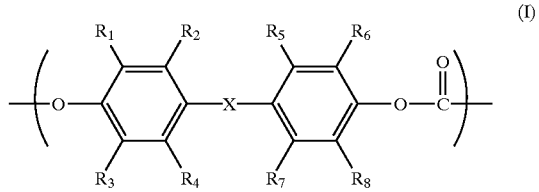

(I)

wherein $R_1$ to $R_8$ are each independently at least one kind selected from a hydrogen atom, halogen atoms and hydrocarbon groups of 1 to 6 carbon atoms, and X is represented by the following formula;

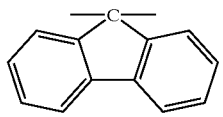

accounts for 5 to 95 mole %, and a repeating unit represented by the following formula (II):

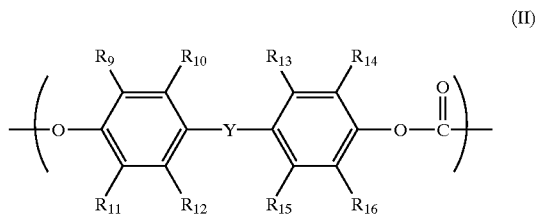

(II)

wherein $R_9$ to $R_{16}$ are each independently at least one kind selected from a hydrogen atom, halogen atoms and hydrocarbon groups of 1 to 22 carbon atoms, and Y is at least one kind of group selected from the group of the following formulae;

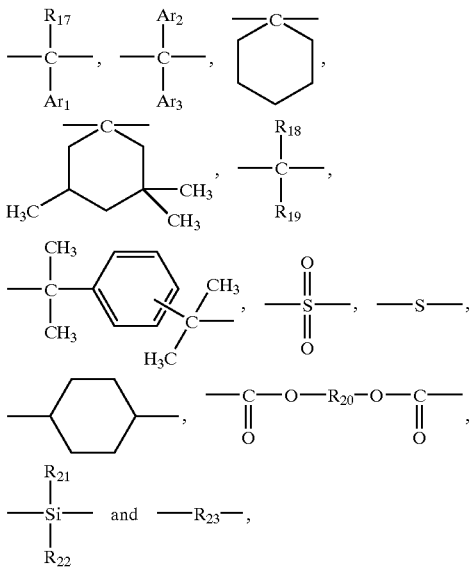

wherein $R_{17}$ to $R_{19}$, $R_{21}$ and $R_{22}$ in Y are each independently at least one kind of group selected from a hydrogen atom, halogen atoms and hydrocarbon groups of 1 to 22 carbon atoms, $R_{20}$ and $R_{23}$ are each independently at least one kind of group selected from hydrocarbon groups of 1 to 20 carbon atoms, and $Ar_1$ to $Ar_3$ are each independently an aryl group of 6 to 10 carbon atoms, accounts for 95 to 5 mole % of the whole.

In the above formula (I), $R_1$ to $R_8$ are each independently selected from a hydrogen atom, halogen atoms and hydrocarbon groups of 1 to 6 carbon atoms. Examples of the hydrocarbon groups of 1 to 6 carbon atoms include an alkyl group such as methyl group, ethyl group, isopropyl group or cyclohexyl group and an aryl group such as phenyl group. Among them, hydrogen atom and methyl group are preferable.

In the above formula (II), $R_9$ to $R_{16}$ are each independently at least one kind of group selected from a hydrogen atom, halogen atoms and hydrocarbon groups of 1 to 22 carbon atoms. Examples of the hydrocarbon groups of 1 to 22 carbon atoms include an alkyl group of 1 to 9 carbon atoms such as methyl group, ethyl group, isopropyl group or cyclohexyl group, and an aryl group such as phenyl group, biphenyl group or terphenyl group. Among them, hydrogen atom and methyl group are preferable.

In Y of the above formula (II), $R_{17}$ to $R_{19}$, $R_{21}$ and $R_{22}$ are each independently at least one kind selected from a hydrogen atom, halogen atoms and hydrocarbon groups of 1 to 22 carbon atoms. Examples of the hydrocarbon groups include the same groups as described above. $R_{20}$ and $R_{23}$ are each independently at least one kind selected from hydrocarbon groups of 1 to 20 carbon atoms and such hydrocarbon groups include the same groups as described above. $Ar_1$ to $Ar_3$ are each independently an aryl group of 6 to 10 carbon atoms such as phenyl group or naphthyl group.

Among the retardation films comprising the polycarbonate copolymer having the above fluorene skeleton, there are a retardation film having wavelength dispersion characteristics of the retardation of R(450)/R(550)<1 and one having wavelength dispersion characteristics of the retardation of R(450)/R(550)≧1, according to the compositional ratio of the fluorene component. A retardation film having various retardation wavelength dispersions within a wide range can be provided according to a simple method by mixing adequate amounts of the two copolymers different in retardation wavelength dispersion.

The copolymerization composition (molar ratio) of the fluorene component in the polycarbonate copolymer and repeating units a and b in the mixture of the polymers A and B can be determined with, for example, a nuclear magnetic resonance (NMR) apparatus.

As the above polycarbonate from the viewpoint of heat resistance, transparency and the like, a polycarbonate copolymer, in which a repeating unit represented by the following formula (III) accounts for 10 to 90 mole % and a repeating unit represented by the following formula (IV) accounts for 90 to 10 mole % based on the whole, is especially preferable.

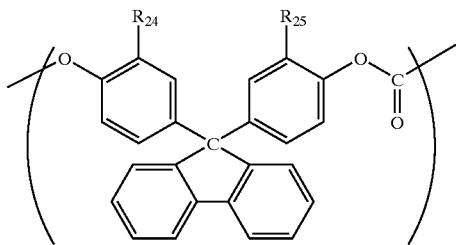

(III)

wherein $R_{24}$ and $R_{25}$ are each independently at least one kind selected from the group consisting of hydrogen atom and methyl group,

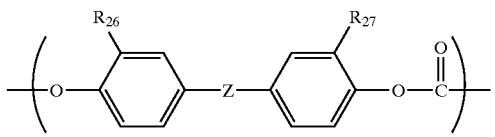

(IV)

wherein $R_{26}$ and $R_{27}$ are each independently at least one kind selected from hydrogen atom and methyl group, and Z is selected from the group of the following formulae;

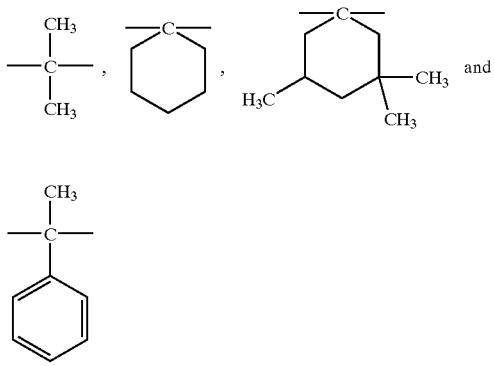

and

As the method for producing the above polycarbonate copolymer, polycondensation processes, molten polycondensation processes and the like, with dihydroxy compounds such as bisphenols and phosgene or carbonic ester-forming compounds such as diphenyl carbonate, are preferably used.

The intrinsic viscosity of the above polycarbonate copolymer is preferably 0.3 to 2.0 dl/g. When the intrinsic viscosity is below 0.3 dl/g, there are problems that the copolymer becomes brittle and mechanical strength cannot be maintained. When the intrinsic viscosity exceeds 2.0 dl/g, problems may arise in that die lines are caused during the solution casting formation of the film or purification, after completing the polymerization, becomes difficult because the solution viscosity is increases too much.

In the present invention, the retardation film in which the retardation has desired wavelength dispersion characteristics is provided by adjusting the mixing ratio of the above polymers A and B and forming the resulting mixture into a film.

For methods for adjusting the mixing ratio of the polymers A and B and mixing the polymers A and B, melt mixing, or solution mixing in which the polymers A and B are mixed in a solvent dissolving them, may be applied. The solution casting method, however, is preferable for the reason described below. Therefore, mixing is preferably carried out in the solvent dissolving the polymers A and B and the film is subsequently preferably formed by the solution casting method.

The mixing ratio of the polymers A and B is not especially limited and, however, the structures and contents of the repeating units a and b contained in the mixture of the polymers A and B greatly contribute to optical characteristics of the retardation film as mentioned above. The mixing amount of the polymers A and B is suitably determined by taking the ratios of the repeating units a and b constituting the polymers A and B into consideration. The ratio of the polymer A is usually within the range of 1 to 99% by weight, preferably within the range of 5 to 95% by weight, more preferably within the range of 10 to 90% by weight. The ratio of the polymer B is usually within the range of 99 to 1% by weight, preferably within the range of 95 to 5% by weight, more preferably within the range of 90 to 10% by weight. The mixing ratio is determined so that the ratio of the repeating unit a, based on the total amount of the repeating units a and b contained in the mixture of the polymers A and B, is 50 to 99 mole %, preferably 50 to 95 mole %. When at least either one of the polymers A and B further contains another repeating unit c, the mixing ratio should be determined by taking even the amount of the repeating unit c into consideration of course.

The resulting mixture is then formed into a film by, for example, a melt extrusion method or the solution casting method. In the solution casting method, a solution composition comprising the mixture dissolved in a solution is formed into a film by casting the solution composition onto a stainless steel belt or a film belt, according to a casting method for extruding the solution composition from a die, a doctor knife method or the like and, if necessary, stretching the film so as to provide optical characteristics such as a desired retardation. Thereby, the retardation film is obtained. The solution casting method is preferable because the unevenness of the film thickness is reflected in unevenness of the retardation in the retardation film and the contamination of foreign materials or the like is not permitted.

The solution casting method comprises a step of dissolving the polymers A and B in an organic solvent and producing a solution composition (a dissolving step), a step of casting the resulting solution composition onto a support (a casting step) and a step of drying the cast solution composition containing the organic solvent (a drying step) in the order mentioned.

The present invention will be detailed by citing a preferred example using polycarbonates as both the polymers A and B.

In the dissolving step, the solution composition is usually prepared by using a solvent dissolving the polycarbonates.

Although the solvent is not especially limited, examples thereof include haloalkanes such as methylene chloride, chloroform or 1,2-dichloroethane; cyclic ethers such as tetrahydrofuran, 1,3-dioxolane or 1,4-dioxane; ketones such as methyl ethyl ketone, methyl isiobutyl ketone or cyclohexanone; and aromatic hydrocarbons such as chlorobenzene. Among them, methylene chloride and dioxolane are preferable from the viewpoint of solubility and stability of the solution composition. One kind of the solvent may be used or a mixed solvent of two or more kinds may be used.

A polymer concentration of 1 to 50% by weight in the solution composition is usually used. When methylene chloride is used, the polymer concentration is 5 to 40% by weight, preferably 10 to 30% by weight depending on the molecular weight (viscosity) of the polymer used.

In the dissolving step, various ultraviolet light absorbers such as phenylsalicylic acid, 2-hydroxybenzophenone or triphenyl phosphate, a bluing agent in order to change the color tone, an antioxidant or the like may be added into the solution composition. An additive such as a plasticizer may be introduced, and, in this case, the ratio to the polymer solid is 10% by weight or less, more preferably 3% by weight or less.

In the casting step, a preferred production process, wherein an unstretched film is produced according to the solution casting method by using a solution composition containing methylene chloride as a solvent, is explained as a representative example.

The above solution composition is cast onto a support such as a stainless steel belt or a film belt. The solvent is gradually removed from the cast material on the belt and the cast material is then stripped from the top surface of the support when the amount of the contained solvent in the cast material reaches about 15 to 20% by weight. The solvent-containing film stripped from the support is continuously treated by the next drying step.

The drying step can be carried out by dividing it into, for example, the following the first to the third step:

In the first step, the atmospheric temperature is adjusted to 15 to 40° C. and the drying of the above film containing the solvent is made to proceed while conveying the above film for usually several minutes to about 1 hour. Thereby, the residual solvent concentration in the film can be controlled to 10 to 15% by weight.

In the second step, the film is then fed into a pin tenter and conveyed while being heated by holding and fixing both ends with pin sheets. The heating temperature and contraction ratio of the pin tenter rails are set at prescribed values at this time. The concentration of the solvent remaining in the film can be controlled to 3 to 5% by weight by drying the film while conveying the film for usually several minutes to several tens of minutes in the second step.

Further, in the third step, the film is passed through a dryer such as a roll suspended type and treated by applying a desired temperature and a desired tension. When methylene chloride is used as the solvent, a small amount of the methylene chloride may remain in the film obtained by drying. The amount of the remaining solvent at this time is preferably 0.5% by weight or less, more preferably 0.3% by weight or less, far more preferably 0.1% by weight or less. When the film is further stretched, the amount of the remaining solvent is preferably 0.3 to 2% by weight, though the amount varies with the objective optical characteristics.

Although the resulting retardation film is an unstretched film, the film, if necessary, is stretched so as to have a desired retardation. The retardation may be selected according to the uses of the retardation film. The film is stretched under stretching conditions of a film temperature within the range of $Tg\pm10°$ C. and usually to 1.05 to 3 times.

The film thickness of the resulting retardation film is preferably 5 to 200 $\mu$m, more preferably 10 to 120 $\mu$m.

Incidentally, it is known that a film having an optical anisotropy generally provides a different retardation value for incident light from the oblique direction as compared with the incident light from the front. The three-dimensional refractive index of a polymeric material is represented by nx, ny and nz, and the respective definitions are as follows:

nx: refractive index in the main orientation direction in the film plane ny: refractive index in the direction orthogonal to the main orientation direction in the film plane, and nz: refractive index in the normal direction on the film surface wherein the main orientation direction means, for example, the flow direction of the film and refers to the direction in which polymer main chain is oriented in chemical structure. As mentioned above, in the present invention, the optical anisotropy is positive when nx>nz and the optical anisotropy is negative when nx<nz. The three-dimensional refractive index is measured by an ellipsometry which is a technique for analyzing the polarization of exiting light obtained by making polarized light incident on the film. In the present invention, the three-dimensional refractive index is obtained by a method for regarding the optical anisotropy of the film as a refractive index ellipsoid according to a known equation of the refractive index ellipsoid. Since the three-dimensional refractive index has the wavelength dependence of a light source used, the three-dimensional refractive index is preferably defined by the wavelength of the light source used. The following equation (3) is known as a method for noting the optical anisotropy using the three-dimensional refractive index.

$$Nz=(nx-nz)/(nx-ny) \qquad (3)$$

When the three-dimensional refractive index, however, is defined by using the equation, the incident angle dependence of the retardation value is extremely reduced when Nz is within the range of 0.3 to 1.5. Especially when Nz is 0.5, the incident angle dependence of the retardation value is substantially neglected, and the same retardation value is obtained even if light comes from any angle.

Further, the slow axis of the film having the positive optical anisotropy is nx and the fast axis is ny, according to the above definition.

Thus, according to the present invention, a method for producing the retardation film is provided, by adjusting the mixing ratio of the polymers A and B, which are mutually compatible and are satisfying the following conditions (1) to (4), and by forming the mixture into a film, so that the film has desired wavelength dispersion characteristics of retardation:

(1) the polymer A is a polycarbonate copolymer comprising the repeating units a and b, (2) the polymer B is a polycarbonate copolymer comprising the repeating units a and b and is different from the polymer A in copolymerization composition, (3) the repeating unit a contains a bisphenol component having a fluorene ring, and (4) the mixing ratio of the polymer A and B is determined so that the ratio of the repeating unit a is 50 to 99 mole % based on the total amount of the repeating units a and b contained in the mixture.

For example, the following example is one preferable embodiment in the present invention.

The polymer A is a polycarbonate copolymer comprising a repeating unit represented by the above formula (III) (with the proviso that $R_{24}$ and $R_{25}$ are methyl groups) as the repeating unit a and a repeating unit represented by the above formula (IV) (with the proviso that Z is isopropylidene group) as the repeating unit b. The amount of the repeating unit represented by the above formula (III) is 50 to 90 mole %, and the amount of the repeating unit represented by the above formula (IV) is 50 to 10 mole %. The polymer B comprises the same repeating units a and b as those in the polymer A. The amount of the repeating unit represented by the above formula (III) is 20 to 60 mole %, and the amount of the repeating unit represented by the above formula (IV) is 80 to 40 mole %. The mixing ratio of the polymers A and B is 1 to 99% by weight of the polymer A and 99 to 1% by weight of the polymer B, preferably 20 to 97% by weight of the polymer A and 80 to 3% by weight of the polymer B, more preferably 30 to 95% by weight of the polymer A and 70 to 5% by weight of the polymer B. The polymer A has a positive optical anisotropy when the polymer A is solely formed into the retardation film, and the polymer B has a positive optical anisotropy when polymer B is solely formed into the retardation film. When the polymer A is solely formed into the retardation film, a ratio of $R(450)/R(550)$ is less than 1. On the other hand, when the polymer B is solely formed into the retardation film, the ratio of $R(450)/R(550)$ is 1 or above, and the difference between the ratio of the polymer A and the ratio of the polymer B is 0.2 or more. The retardation film prepared by the producing method of the present invention, preferably, has the wavelength dispersion of the retardation satisfying the above formula (1) and is capable of assuming various retardation wavelength dispersions. Accordingly, the retardation film is suitably used as, for example a color compensating film or a viewing angle widening film of a liquid crystal display device, a retardation film for circularly polarizing plates of a reflective type liquid crystal display device or an antireflection film, a retardation film used in an optical pickup of optical recorders, or a protective film for optical recording media.

Therefore, according to the producing method of the present invention, a retardation film, with a high optical quality, in which the wavelength dispersion of the retardation is highly controlled, is provided from the composition prepared by mixing the mutually compatible polymers A and B, wherein the polymers A and B satisfy the following conditions (1) and (2):

(1) the polymer A is a copolymer comprising the repeating units a and b, and (2) the polymer B is a copolymer comprising the repeating units a and b and is different from the polymer A in copolymerization composition.

In the above retardation film, the polymers A and B are preferably aromatic polyester polymers.

In the above retardation film, the mixing ratio of the polymers A and B is preferably determined so that the ratio of the repeating unit a is 50 to 99 mole % based on the total amount of the repeating units a and b contained in the composition.

In the above retardation film, more preferably, the polymers A and B are polycarbonate copolymers comprising repeating units a and b, wherein the repeating unit a contains a bisphenol component having a fluorine ring, the contents of the polymers A and B contained in the mixture are 1 to 99% by weight of the polymer A and 99 to 1% by weight of the polymer B, the ratio of the repeating unit a contained in the mixture is 50 to 90 mole % and the ratio of the repeating unit b is 50 to 10 mole %.

Both the polymers A and B, more preferably, have positive optical anisotropies or negative optical anisotropies when each of the polymers A and B is solely formed into the retardation film.

The difference between the ratio of $R(450)/R(550)$ of the polymer A and the ratio of the polymer B is, more preferably, 0.1 or above in the case that each of the polymers A and B is solely formed into the retardation film, respectively, [wherein $R(450)$ and $R(550)$ are each the retardation in the film plane of the retardation film measured at measuring wavelengths of 450 nm and 550 nm].

The retardation film, more preferably, has a low haze value and excellent transparency.

The retardation film, more preferably, satisfies the following formula (1):

$$R(450)/R(550)<1 \tag{1}$$

[wherein the definitions of $R(450)$ and $R(550)$ are the same as described above].

EXAMPLES

The present invention will be explained in more detail by citing Examples, which are not intended to limit the present invention at all.

(Methods of Evaluation)

Material characteristic values and the like described in the present specification are obtained by the following methods of evaluation:

(1) Measurement of Retardation Value [$R=\Delta n \cdot d$ (nm)]

The retardation R value which is the product of the birefringence $\Delta n$ and the film thickness d of the retardation film and K value were measured with "M150" which is a spectral ellipsometer manufactured by JASCO Corporation. The R value was measured with the incident light and the retardation film surface in an orthogonal state.

(2) Measurement of Total Light Transmittance and Haze Value

The total light transmittance and haze value of the retardation film were measured with an integrating sphere type light transmittance measuring instrument according to Japanese Industrial Standards JISK7105 "Testing Methods for Optical Properties of Plastics". A color difference/turbidity measuring instrument "COH-300A" manufactured by Nihon Denshoku K. K. was used as an evaluation apparatus.

(3) Measurement of Thickness

The thickness of the retardation film was measured with an electronic microprobe manufactured by Anritsu Corporation.

(4) Measurement of Polymer Copolymerization Ratio

The copolymerization ratio was measured by proton NMR with "JNM-alpha600" manufactured by Nippon Denshi K. K. Heavy benzene was used as a solvent in the case of a copolymer of the following monomer [A] and monomer [B], and the ratio was calculated from the proton intensity ratio of the respective methyl groups.

The structures of the monomers in the polycarbonate in Examples and Comparative Examples are shown as follows:

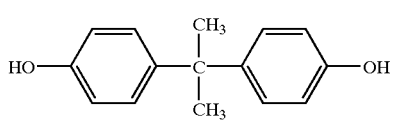
Monomer [A]

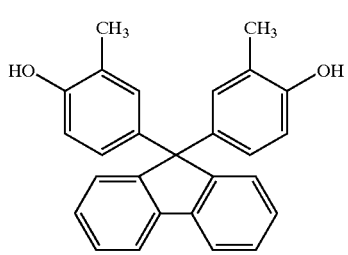
Monomer [B]

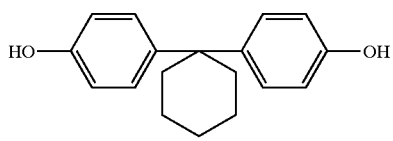
Monomer [C]

Synthesis Examples 1 and 2

Production of Polycarbonate Copolymers

An aqueous solution of sodium hydroxide and ion-exchanged water were charged into a reaction vessel equipped with a stirrer, a thermometer and a reflux condenser. The monomers [A] and [B] having the above structures were dissolved in the aqueous solution and ion-exchanged water in a prescribed molar ratio as shown in Table 1. A small amount of a hydrosulfite was added to the resulting solution to provide reaction solutions. Methylene chloride was then added to the reaction solutions. The temperature of the reaction solutions was 20° C. Phosgene was blown into the reaction solutions for about 60 minutes. p-tert-Butylphenol was further added to the reaction solutions for emulsification. Triethylamine was then added to the resulting emulsions, and the obtained mixtures were stirred at 30° C. for about 3 hours to complete the reaction. The organic phases were separated from the obtained reaction liquids. The methylene chloride was evaporated from the separated liquids to thereby afford polycarbonate copolymers. The composition ratios of the resulting copolymers were roughly the same as the ratios of the amounts of the charged monomers.

The obtained two copolymers (copolymers 1 and 2) were respectively dissolved in methylene chloride to prepare solution compositions at a solid concentration of 20% by weight. The resulting solution compositions were cast onto a stainless steel belt and heated while being gradually heated up from 15° C., stripped from the stainless steel belt and further dried to prepare cast films. The films thus obtained had an R value of 10 nm or below and contained 0.9% by weight of the methylene chloride.

The films were uniaxially stretched at about the glass transition point temperature of the copolymers to 1.3 times to provide retardation films. Characteristics of the retardation films are collectively shown in Table 1.

TABLE 1

| Synthesis Example | 1 Copolymer 1 | 2 Copolymer 2 |
|---|---|---|
| Amount of Charged Monomer [A] (mole %) | 30 | 70 |
| Amount of Charged Monomer [B] (mole %) | 70 | 30 |
| R(450) (nm) | 12.5 | 377.7 |
| R(550) (nm) | 50.1 | 356.3 |
| R(650) (nm) | 63.1 | 342.0 |
| R(450)/R(550) | 0.25 | 1.06 |
| R(650)/R(550) | 1.26 | 0.96 |
| Thickness ($\mu$m) | 70 | 70 |
| Total Light Transmittance (%) | 90 | 91 |
| Haze (%) | 0.2 | 0.1 |
| Optical Anisotropy | Positive | Positive |

Examples 1 to 5

Production of Retardation Films

The copolymers 1 and 2 produced in the above Synthesis Examples were dissolved in methylene chloride in prescribed mixing ratios (parts by weight) mentioned in Table 2 to prepare solution compositions at a solid concentration of 20% by weight. The resulting solution compositions were cast onto a stainless steel belt, heated while being gradually heated up from 15° C., stripped from the stainless steel belt and further dried to prepare cast films. The films thus obtained had an R value of 10 nm or below and contained 1% by weight of the methylene chloride.

The obtained films were subsequently uniaxially stretched at about the glass transition point temperature to 1.8 times to thereby afford retardation films 1 to 5. Characteristics of the resulting films are collectively shown in Table 2. The contents of B in Table 2 are the ratios (mole %) of the monomer unit B accounting for the whole mixture of the copolymers 1 and 2.

TABLE 2

| Example | 1 (1) | 2 (2) | 3 (3) | 4 (4) | 5 (5) |
|---|---|---|---|---|---|
| Copolymer 1 (parts by weight) | 54.6 | 78.3 | 87.2 | 94.1 | 95.4 |
| Copolymer 2 (parts by weight) | 45.4 | 21.7 | 12.8 | 5.9 | 4.6 |
| Content of B (mole %) | 50.1 | 60.0 | 64.0 | 67.2 | 67.8 |
| R(450) (nm) | 517.2 | 308.6 | 247.7 | 120.1 | 103.3 |
| R(550) (nm) | 512.1 | 321.5 | 275.2 | 150.1 | 135.9 |
| R(650) (nm) | 507.0 | 324.7 | 283.5 | 160.6 | 149.5 |
| R(450)/R(550) | 1.01 | 0.96 | 0.90 | 0.80 | 0.76 |
| R(650)/R(550) | 0.99 | 1.01 | 1.03 | 1.07 | 1.10 |
| Film Thickness ($\mu$m) | 75 | 70 | 80 | 100 | 100 |
| Total Light Transmittance (%) | 91 | 90 | 90 | 90 | 90 |
| Haze (%) | 0.2 | 0.2 | 0.2 | 0.2 | 0.1 |
| Optical Anisotropy | Positive | Positive | Positive | Positive | Positive |

Notes:
(1) means "Retardation Film 1".
(2) means "Retardation Film 2".
(3) means "Retardation Film 3".
(4) means "Retardation Film 4".
(5) means "Retardation Film 5".

The retardation films having various retardation wavelength dispersion characteristics could be obtained by preparing the retardation films from the resultant mixtures mixed with the copolymers 1 and 2 in various ratios as described above.

Synthesis Examples 3 and 4

Production of Polycarbonate Copolymers

An aqueous solution of sodium hydroxide and ion-exchanged water were charged into a reaction vessel equipped with a stirrer, a thermometer and a reflux condenser, and the monomers [C] and [B] having the above structures were then dissolved in the aqueous solution and ion-exchanged water in prescribed molar ratios mentioned in Table 3. A small amount of a hydrosulfite was added to the obtained solutions to provide reaction solutions. Methylene chloride was added to the resulting reaction solutions, and the temperature of the reaction solutions was 20° C. Phosgene was blown into the reaction solutions for about 60 minutes, and p-tert-butylphenol was further added to the reaction solutions for emulsification. Triethylamine was then added to the obtained emulsions, and the resulting mixtures was stirred at 30° C. for about 3 hours to complete the reaction. The organic phases were separated from the obtained reaction liquids, and the methylene chloride was evaporated from the separated liquids to thereby provide polycarbonate copolymers. The composition ratios of the resulting copolymers were roughly the same as the ratios of the amounts of the charged monomers.

The resulting two copolymers (copolymers 3 and 4) were respectively dissolved in methylene chloride to prepare solution compositions at a solid concentration of 20% by weight. The obtained solution compositions were cast onto a stainless steel belt, heated while being gradually heated up from 15° C., stripped from the stainless steel belt and further dried to prepare cast films. The films thus obtained had an R value of 10 nm or below and contained 1% by weight of the methylene chloride.

The obtained films were subsequently uniaxially stretched at about the glass transition point temperature to 1.2 times to provide retardation films. Characteristics of the retardation films are collectively shown in Table 3.

TABLE 3

| Synthesis Example | 3<br>Copolymer 3 | 4<br>Copolymer 4 |
|---|---|---|
| Amount of Charged Monomer [C] (mole %) | 45 | 25 |
| Amount of Charged Monomer [B] (mole %) | 55 | 75 |
| R(450) (nm) | 78.3 | −79.9 |
| R(550) (nm) | 80.1 | −59.6 |
| R(650) (nm) | 80.1 | −51.9 |
| R(450)/R(550) | 0.98 | 1.34 |
| R(650)/R(550) | 1.00 | 0.87 |
| Thickness (μm) | 70 | 70 |
| Total Light Transmittance (%) | 90 | 91 |
| Haz (%) | 0.2 | 0.1 |
| Optical Anisotropy | Positive | Negative |

Examples 6 and 7

Production of Retardation Films

The copolymers 3 and 4 produced in the above Synthesis Examples 3 and 4 were dissolved in methylene chloride in prescribed mixing ratios (parts by weight) mentioned in Table 3 to prepare solution compositions at a solid concentration of 20% by weight. The resulting solution compositions were cast onto a stainless steel belt, heated while being gradually heated up from 15° C., stripped from the stainless steel belt and further dried to prepare cast films. The films thus obtained had an R value of 10 nm or below and contained 1% by weight of the methylene chloride.

The resulting films were subsequently uniaxially stretched at about the glass transition point temperature to 1.8 times to afford retardation films 6 and 7. Characteristics of the retardation films are collectively shown in Table 4. The contents of B in Table 4 are ratios (mole %) of the monomer unit B accounting for the whole mixture of the copolymers 3 and 4.

TABLE 4

| Example | 6<br>(6) | 7<br>(7) |
|---|---|---|
| Copolymer 3 (parts by weight) | 73.8 | 48.8 |
| Copolymer 4 (parts by weight) | 26.2 | 51.2 |
| Content of B (mole %) | 60.0 | 65.0 |
| R(450) (nm) | 168.2 | 21.4 |
| R(550) (nm) | 191.1 | 52.3 |
| R(650) (nm) | 194.9 | 57.5 |
| R(450)/R(550) | 0.88 | 0.41 |
| R(650)/R(550) | 1.02 | 1.10 |
| Film Thickness (μm) | 75 | 70 |
| Total Light Transmittance (%) | 91 | 90 |
| Haze (%) | 0.2 | 0.2 |
| Optical Anisotropy | Positive | Positive |

Notes: (6) means "Retardation Film 6".
(7) means "Retardation Film 7".

The retardation films having various retardation wavelength dispersion characteristics could be obtained by preparing the retardation films from the resulting mixtures mixed with the copolymers 3 and 4 in various ratios as described above.

Synthesis Examples 5, 6 and 7

Production of Polycarbonate Copolymers

The same procedures as in Synthesis Example 1 were carried out to produce polycarbonate copolymers 5, 6 and 7 by, except that prescribed amounts of the monomers [A] and [B] shown in Table 5 were applied. The compositional ratios of the resulting copolymers 5, 6 and 7 were analyzed in detail by the above proton NMR method to find that the repeating unit of the monomer [B] was contained in an amount of 70.4, 31.7 and 66.9 mole % in each of the resulting copolymers, respectively.

TABLE 5

| Synthesis Example | 5<br>Copolymer 5 | 6<br>Copolymer 6 | 7<br>Copolymer 7 |
|---|---|---|---|
| Amount of Charged Monomer [A] (mole %) | 30 | 68 | 33 |
| Amount of Charged Monomer [B] (mole %) | 70 | 32 | 67 |

Reference Example 1

Production of Retardation Film

Cast films were prepared by using the copolymer 7 produced in the above Synthesis Example 7 according to the same method as in above Example 1. The films thus obtained had an R value of 10 nm or below and contained 1% by weight of the methylene chloride.

The resulting films were subsequently uniaxially stretched at about the glass transition point temperature to 1.8 times to thereby provide a retardation film 8. Characteristics of the retardation film are collectively shown in Table 6. The content of B in Table 6 is the ratio (mole %) of the monomer unit B.

TABLE 6

| Reference Example | 1<br>Retardation Film 8 |
|---|---|
| Content of B (mole %) | 66.9 |
| R(450) (nm) | 110.1 |
| R(550) (nm) | 134.3 |
| R(650) (nm) | 142.4 |
| R(450)/R(550) | 0.82 |
| R(650)/R(550) | 1.06 |
| Film Thickness ($\mu$m) | 79 |
| Total Light Transmittance (%) | 91 |
| Haze (%) | 0.2 |
| Optical Anisotropy | Positive |

Example 8

Production of Retardation Film

The copolymers 5 and 6 produced in the above Synthesis Example were dissolved in methylene chloride in a prescribed mixing ratio (parts by weight) mentioned in Table 7 so as to provide the same contents of the monomer units [A] and [B] as in those of the retardation film 8 in the above Reference Example 1. Cast films were then prepared by the same method as in the above Example 1. The films thus obtained had an R value of 10 nm or below and contained 1% by weight of the solvent.

The resulting films were subsequently uniaxially stretched at about the glass transition point temperature to 1.8 times to thereby produce a retardation film 9. Characteristics of the retardation film 9 are collectively shown in Table 7. The content of B in Table 7 is the ratio (mole %) of the monomer unit B accounting for the whole mixture of the copolymers 5 and 6.

TABLE 7

| Example | 8<br>Retardation Film 9 |
|---|---|
| Copolymer 5 (parts by weight) | 92.3 |
| Copolymer 6 (parts by weight) | 7.7 |
| Content of B (mole %) | 66.9 |
| R(450) (nm) | 108.0 |
| R(550) (nm) | 131.7 |
| R(650) (nm) | 139.6 |
| R(450)/R(550) | 0.82 |
| R(650)/R(550) | 1.06 |
| Film Thickness ($\mu$m) | 78 |
| Total Light Transmittance (%) | 91 |
| Haze (%) | 0.2 |
| Optical Anisotropy | Positive |

As evident from Table 7, wavelength dispersion characteristics of the retardation in the resulting retardation film 9 were the same as those of the retardation film 8 obtained in the Reference Example. Thus, it is found that the retardation film, having the same characteristics as those of the retardation film produced from one copolymer, could be obtained according to the producing method for the retardation film of the present invention.

Incidentally, the content of the monomer B in the retardation film 8 in Reference Example 1 is the same as that in the retardation film 9 when observed by the proton NMR. The difference between both is that the polymeric material constituting the retardation film 8 is one copolymer, but the polymeric material constituting the retardation film 9 is a mutual blend of the two copolymers. The structure of the polymeric materials was analyzed by using $^{13}$C-NMR. A difference in chemical shift of carbonyl carbon of carbonate bonds between the monomers [A] and [A], the monomers [A] and [B] and the monomers [B] and [B] was utilized in the method of evaluation. In Table 8, the dyad structures were described as [A]-[A], [A]-[B] and [B]-[B]. It is found from Table 8 that the abundance ratio of the three structures varies in the polymeric materials.

Namely, whether the retardation film is formed from one copolymer or formed by blending two kinds of copolymers, which have the same two repeating units as ones possessed by the copolymer and different ratio of the respective contained repeating units, could be distinguished by evaluating the retardation film as described above. It is assumed that the blend and the copolymer can be distinguished even in the case of a polymer other than the polycarbonate by the method of evaluation.

TABLE 8

| Dyad Structure | [A]—[A] | [A]—[B] | [B]—[B] |
|---|---|---|---|
| Retardation Film 8 (Copolymer) | 0.098 | 0.465 | 0.437 |
| Retardation Film 9 (Blend Material) | 0.099 | 0.441 | 0.459 |

Effects of the Invention

According to the present invention, retardation films having various retardation wavelength dispersion characteristics can be provided with good productivity by using a simple method for mixing at least two mutually compatible polymers.

Industrial Applicability

In the present invention, the retardation film is produced by adjusting the mixing ratio of at least two kinds of mutually compatible polymers A and B and by forming the resulting mixture into the film. The polymers A and B are copolymers comprising the respective two common repeating units and are different in copolymerization composition. According to the present invention, the retardation film having a desired wavelength dispersion can industrially and simply be produced within a wide range of the retardation wavelength dispersion of the retardation film formed from the polymer A and the retardation wavelength dispersion of the retardation film formed from the polymer B. Furthermore, the high-quality retardation film capable of controlling the wavelength dispersion of the retardation at a high level can be provided according to the present invention. The method of the present invention is extremely valuable as a method for providing a retardation film applicable to display devices applying a liquid crystal or display input devices such as a touch panel.

What is claimed is:

1. A method for producing a retardation film, which comprises the steps of mixing mutually compatible polymers A and B which satisfy the following conditions (1) and (2), and of forming the resulting mixture into a film, wherein the mixing ratio is adjusted to adjust the ratio R(450)/R(550) for the mixture of the polymers A and B:

(1) the polymer A is a copolymer comprising repeating units a and b, and (2) the polymer B is a copolymer comprising the repeating units a and b and is different from the polymer A in copolymerization composition and in the ratio R(450)/R(550), wherein the following formula (1) is satisfied for the retardation film:

$$R(450)/R(550) < 1 \quad (1)$$

wherein R(450) and R(550) are each the retardation in the film plane of the retardation film measured at measuring wavelengths of 450 nm and 550 nm and R(450)/R (550) is their ratio.

2. The method for producing the retardation film according to claim 1, wherein the difference between R(450)/R (550) of a retardation film made from only the polymer A and R(450)/R(550) of a retardation film made from only the polymer B is 0.1 or above, wherein R(450) and R(550) are each the retardation in the film plane of the retardation film measured at measuring wavelengths of 450 nm and 550 nm and R(450)/R (550) is their ratio.

3. The method for producing the retardation film according to claim 1, wherein the following formula (1) is satisfied for a retardation film made from only the polymer A $$R(450)/R(550)<1 \qquad (1)$$

wherein R(450) and R(550) are each the retardation in the film plane of the retardation film measured at measuring wavelengths of 450 nm and 550 nm.

4. The method for producing the retardation film according to claim 3, wherein the following formula (2) is satisfied for a retardation film made from only the polymer B $$R(450)/R(550) \geq 1 \qquad (2)$$

wherein R(450) and R(550) are each the retardation in the film plane of the retardation film measured at measuring wavelengths of 450 nm and 550 nm.

5. The method for producing the retardation film according to claim 1, wherein the repeating unit a contains a bisphenol component having a fluorene ring.

6. The method for producing the retardation film according to claim 1, wherein the polymers A and B are aromatic polyester polymers.

7. The method for producing the retardation film according to claim 6, wherein the aromatic polyester polymers are polycarbonates.

8. The method for producing the retardation film according to claim 7, wherein the polymers A and B are the polycarbonate copolymers in which a repeating unit a represented by the following formula (I) accounts 5 to 95 mole %:

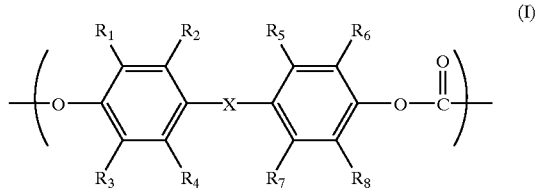

(I)

wherein $R_1$ to $R_8$ are each independently at least one kind selected from a hydrogen atom, halogen atoms and hydrocarbon groups of 1 to 6 carbon atoms; and X is represented by the following formula:

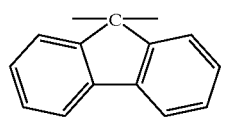

and
a repeating unit b represented by the following formula (II) accounts for 95 to 5 mole % of the whole:

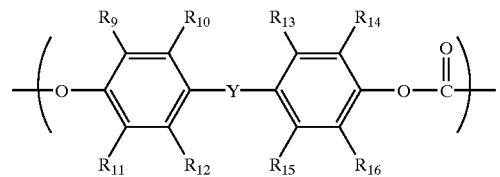

(II)

wherein $R_9$ to $R_{16}$ are each independently at least one kind selected from a hydrogen atom, halogen atoms and hydrocarbon groups of 1 to 22 carbon atoms and Y is at least one kind of group selected from the group of the following formulae:

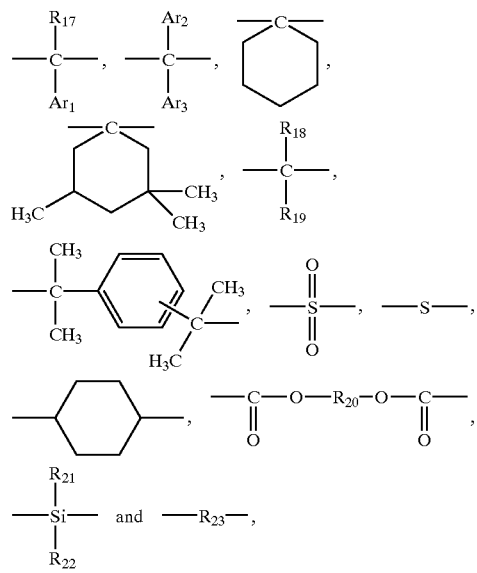

wherein $R_{17}$ to $R_{19}$, $R_{21}$ and $R_{22}$ are each independently at least one kind of group selected from a hydrogen atom, halogen atoms and hydrocarbon groups of 1 to 22 carbon atoms; $R_{20}$ and $R_{23}$ are each independently at least one kind of group selected from hydrocarbon groups of 1 to 20 carbon atoms; and $Ar_1$ to $Ar_3$ are each independently an aryl group of 6 to 10 carbon atoms.

9. The method for producing the retardation film according to claim 1, wherein both the polymers A and B have positive optical anisotropies or negative optical anisotropies, as measured when each is individually formed into a retardation film.

10. The method for producing the retardation film according to claim 1, wherein the mixing ratio of the polymers A and B is determined so that the ratio of the repeating unit a is 50 to 99 mole % based on the total amount of the repeating units a and b contained in the mixture.

11. The method for producing the retardation film according to claim 1, which comprises a step of dissolving the polymers A and B in an organic solvent and producing a solution composition, a step of casting the solution composition onto a support, and a step of drying the cast solution composition containing the organic solvent.

12. A method for producing a retardation film comprising the steps of mixing mutually compatible polymers A and B which satisfy the following conditions (1) to (4), and of forming the resulting mixture into a film, wherein the mixing ratio of polymer A to polymer B is adjusted to adjust the ratio R(450)/R(550) for the mixture of the polymers A and B:

(1) the polymer A is a polycarbonate copolymer comprising repeating units a and b, (2) the polymer B is a polycarbonate comprising the repeating units a and b and is different from the polymer A in copolymerization composition, (3) the polymers A and B have a difference between a ratio of R(450)/R(550) of a retardation film made from only polymer A and the ratio of a retardation film made from only the polymer B of 0.1 or above, wherein R(450) and R(550) are each the retardation in the film plane of the retardation film measured at measuring wavelengths of 450 nm and 550 nm and R(450)/R(550) is their ratio and (4) the mixing ratio of the polymers A and B is determined so that the ratio of the repeating unit a is 50 to 99 mole % based on the total amount of the repeating units a and b contained in the mixture.

13. A method for producing a retardation film, which comprises the steps of mixing two mutually compatible polymers A and B which satisfy the following conditions (1) to (4), and of forming the resulting mixture into a film, wherein the mixing ratio of polymer A to polymer B is adjusted to adjust the ratio R(450)/R(550) for the mixture of the polymers A and B:

(1) the polymer A is a polycarbonate copolymer comprising repeating units a and b, (2) the polymer B is a polycarbonate copolymer comprising the repeating units a and b and is different from the polymer A in copolymerization composition, (3) the repeating unit a comprises a bisphenol component having a fluorene ring, and (4) the mixing ratio of the polymers A and B is determined so that the ratio of the repeating unit a is 50 to 99 mole % based on the total amount of the repeating units a and b contained in the mixture, wherein R(450) and R(550) are each the retardation in the film plane of the retardation film measured at measuring wavelengths of 450 nm and 550 nm and R(450)/R(550) is their ratio.

14. A retardation film comprising a composition prepared by mixing mutually compatible polymers A and B which satisfy the following conditions (1) and (2):

(1) the polymer A is a copolymer comprising repeating units a and b and (2) the polymer B is a copolymer comprising the repeating units a and b and is different from the polymer A in copolymerization composition and in the ratio R(450)/R(550), wherein the retardation film satisfies the following formula (1):

$$R(450)/R(550)<1 \qquad (1)$$

wherein R(450) and R(550) are each the retardation in the film plane of the retardation film measured at measuring wavelengths of 450 nm and 550 nm.

15. The retardation film according to claim 14, wherein the polymers A and B are aromatic polyester polymers.

16. The retardation film according to claim 14, wherein the mixing ratio of the polymers A and B is determined so that the ratio of the repeating unit a is 50 to 99 mole % based on the total amount of the repeating units a and b contained in the composition.

17. The method for producing a retardation film as claimed in claim 1, wherein R(450)/R(550) of a retardation film made from only the polymer A and R(450)/R(550) of a retardation film made from only the polymer B each independently satisfy the following formulae (1) or (2):

$$R(450)/R(550)<1 \qquad (1)$$

$$R(450)/R(550)\geq 1 \qquad (2),$$

wherein R(450) and R(550) are each the retardation in the film plane of the retardation film measured at measuring wavelengths of 450 nm and 550 nm and R(450)/R(550) is their ratio.

* * * * *